United States Patent [19]
Ohlsson

[11] Patent Number: 6,129,390
[45] Date of Patent: Oct. 10, 2000

[54] QUICK CONNECT/DISCONNECT COUPLING, TOGETHER WITH METHOD AND DEVICE FOR ITS ASSEMBLY

[75] Inventor: Weimar Ohlsson, Surte, Sweden

[73] Assignee: WEO Hydraulic AB, Kungalv, Sweden

[21] Appl. No.: 08/952,412

[22] PCT Filed: May 7, 1996

[86] PCT No.: PCT/SE96/00593

§ 371 Date: Mar. 16, 1998

§ 102(e) Date: Mar. 16, 1998

[87] PCT Pub. No.: WO96/35906

PCT Pub. Date: Nov. 14, 1996

[30] Foreign Application Priority Data

May 8, 1995 [SE] Sweden ................................. 9501697

[51] Int. Cl.$^7$ ............................................... F16L 35/00
[52] U.S. Cl. ........................ 285/39; 285/307; 285/317; 29/525.01; 29/890.14
[58] Field of Search ............................ 285/305, 39, 307, 285/320, 104, 105, 340; 29/890.14, 453, 525.01

[56] References Cited

U.S. PATENT DOCUMENTS

| | | | |
|---|---|---|---|
| 3,731,955 | 5/1973 | Borsum et al. | 285/307 X |
| 3,744,824 | 7/1973 | Roos | 285/320 X |
| 3,773,360 | 11/1973 | Timbers . | |
| 3,887,222 | 6/1975 | Hammond | 285/307 |
| 5,219,189 | 6/1993 | Demoisson et al. | 285/105 |

FOREIGN PATENT DOCUMENTS

| | | | |
|---|---|---|---|
| 246946 | 11/1960 | Australia | 285/340 |
| 86404 | 1/1959 | Denmark | 285/307 |
| 2400494 | 7/1974 | Germany . | |
| 1810718 | 4/1993 | Russian Federation | 285/307 |
| 451342 | 9/1987 | Sweden . | |

*Primary Examiner*—Dave W. Arola
*Attorney, Agent, or Firm*—Klarquist Sparkman Campbell Leigh & Whinston, LLP

[57] ABSTRACT

A quick connect/disconnect coupling between a female connector and a male connector which is insertable into said female connector, e.g. for connecting a high pressure line to a valve block. The female connector (10) comprises a cylindric space (13) for the cylindrical part (14) of the male connector, the envelope surface of said space being provided with at least one groove (18) for accommodation of resiliently out of and into the cylindrical space movable blocking elements (20). A substantially annular flange (19) is coaxially provided at the outward side of the groove (18) of the female connector, substantially in line with the envelope surface of said space. The blocking means (20) comprise at least three in said groove (18) located metal arc segments, each being biased by an elastic element (21) into an inclined position relative to the symmetrical longitudinal axis of the female connector, said inclined position being the blocking position. In this position, the segments together form a truncated cone, the wide base of which is supported by the outward side of the groove (18), on the radial outside of the flange (19).

10 Claims, 2 Drawing Sheets

QUICK CONNECT/DISCONNECT COUPLING, TOGETHER WITH METHOD AND DEVICE FOR ITS ASSEMBLY

FIELD OF THE INVENTION

This invention concerns a quick connect/disconnect coupling between a female connector and a male connector which is insertable into said female connector, e.g. for connection of a high pressure line to a valve block, wherein a male connector to be used with said female connector, comprises a cylindric part which is insertable into the female connector, the envelope surface of which is provided with a circumferential groove with a certain width, said groove accommodating an axially along the male coupling, between the two walls of the groove movable ring, having a thickness which is substantially equal to the depth of the groove, and which female connector comprises a cylindric space for the cylindrical part of the male connector, the envelope surface of said space being provided with at least one groove for accommodation of resiliently out of and into the cylindrical space movable blocking elements cooperating in their blocking position with that edge of the male connector grove being nearest the outer end of the male connector, and being movable out of their blocking position to a releasing position by movement of the ring toward said outer end edge, which movement is possible by pressing the male connector into the female connector until the blocking means are brought into a friction engagement with the peripheral surface of the ring. Also, the invention concerns a method and an apparatus for assembling said coupling.

BACKGROUND OF THE INVENTION

A quick connect/disconnect coupling according to the above is known through EP 0375674 and is provided with a spring steel ring. Such a spring steel ring provides sufficient locking security for normal hydraulic applications, but risk deformation when hydraulic pressure is extremely high. If the locking ring is designed more sturdy in order to withstand higher pressure, it will be much more difficult to mount the ring into its groove inside the female coupling. The cost of producing this kind of connector is mainly depending upon that the assembly may be made rationally and efficiently. Preferably, assembly is automatized without any need for manual skill.

OBJECT OF THE INVENTION

One object of the invention is to provide a female connector with locking means which solve the problem of reliability during very large hydraulic pressure. A further object of the invention is to provide a method and a tool for assembly of the coupling, so that the problems of providing a rational and efficient assembly of the coupling may be solved.

THE SOLUTION

For this object, the female connector according to the invention is characterized in that a substantially annular flange is coaxially provided at the outward side of the groove of the female connector, substantially in line with the envelope surface of said space, and that the blocking means comprise at least three in said groove located metal arc segments, each being biased by an elastic element into an inclined position relative to the symmetrical longitudinal axis of the female connector, said inclined position being the blocking position, in which the segments together form a truncated cone, the wide base of which is supported by the outward side of the groove, on the radial outside of the flange.

The method according to the invention is characterized in positioning the elastic element into the groove, inserting a feeding head into the cylindric space of the female connector, feeding one blocking element at a time by means of the feeding head, from the opening end of the female connector past the groove, to a position beyond said groove, whereupon the blocking element is moved in the direction backwards while being tilted into the groove, past the flange.

A feeding head for assembling a female connector according to the invention is characterized in that it is provided with a guide sleeve, which is insertable turnable in the cylindric space of the female connector and acting as a guide for a feeding means which is axially movable inside the guide sleeve and comprising a coaxially arranged slide.

BRIEF DESCRIPTION OF THE DRAWINGS

The invention will now be described with reference to embodiments shown in the accompanying drawings, in which.

DESCRIPTION OF A PREFERRED EMBODIMENT

Figure 1:
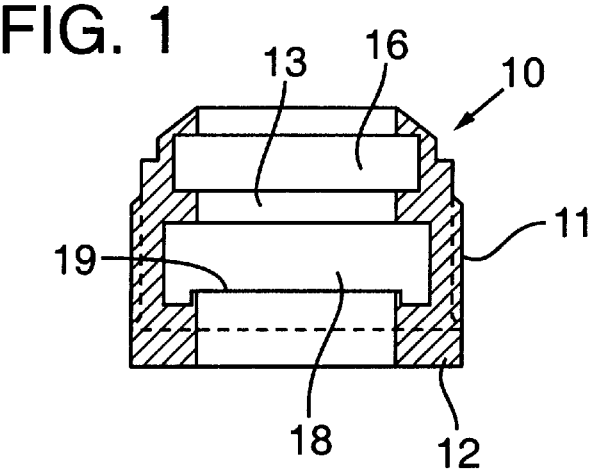
FIG. 1 is a section through a female connector according to the invention, shown before assembly of the blocking elements.

The female connector part 10 in FIG. 1 may for example be mounted in a not shown valve housing by means of a outer thread 11 and a hexagon head 12. This design of the female connector member results in an extraordinarily small consumption of space at the outside of said valve housing, which is advantageous because of increased freedom of design, e.g. when mounting the valve housing on an arm which is hydraulically manoeuvrable.

Figure 2:
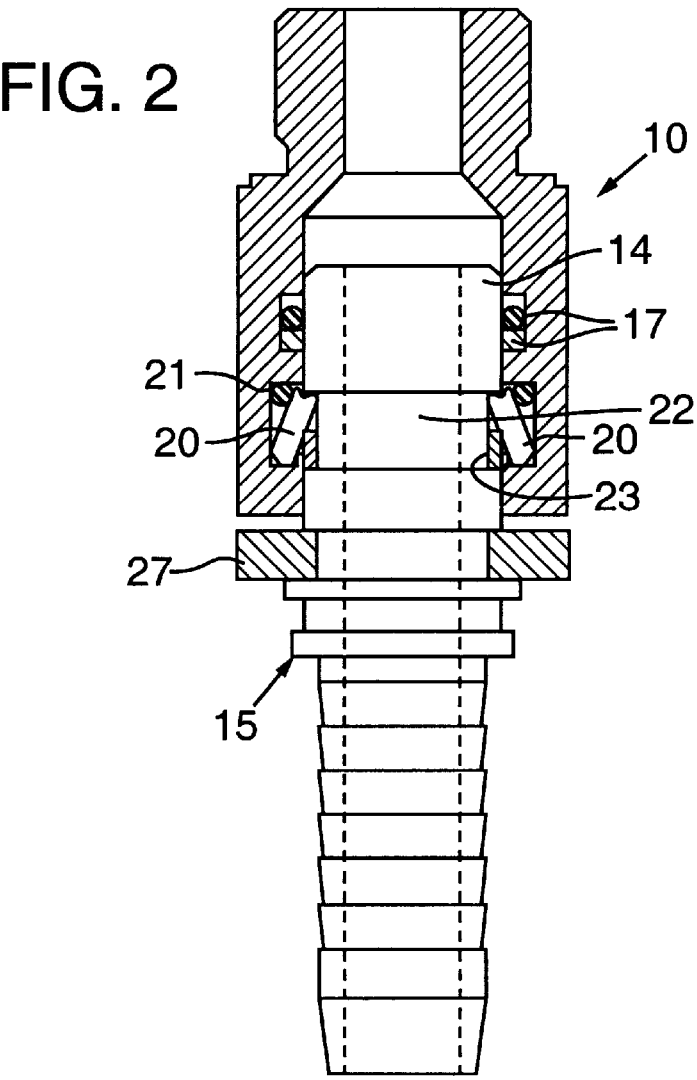
FIG. 2 shows correspondingly a somewhat differently designed female connector with a non sectioned male connector, seal means and blocking elements.

A cylindric space 13 inside the female connector 10 enables the insertion of a corresponding cylindric section 14 of a male connector 15 (see FIG. 2). An inner groove 16 extends coaxially along the envelope surface of the cylindric space and is used for receiving a seal 17 comprising an O-ring and a plastic ring.

An outer groove 18 is higher and wider and also provided with a ring-shaped flange 19 at that side of the groove 18 which faces out towards the entrance opening of the female connector. The groove 18 is used for housing blocking elements 20 which are resiliently movable, or rotatable out of and into the cylindric space 13 by means of the action of an O-ring 21. According to a preferred embodiment of the invention, the groove 18 houses five blocking members 20, each of these being arched with a length of arc corresponding to 72°, so that they combined end against end forming a 360° ring which is shaped as a truncated cone. The blocking elements rest freely in groove 18. This truncated cone converges in the direction from the entrance opening of the female connector, in such a way that the wide base end is supported by the outer side of the groove 18, radially at the outside of the flange 19. The narrow end of the cone projects past the flange 19, out of the groove 18 and with its opposite end edge into the cylindrical space 13.

Figure 3:
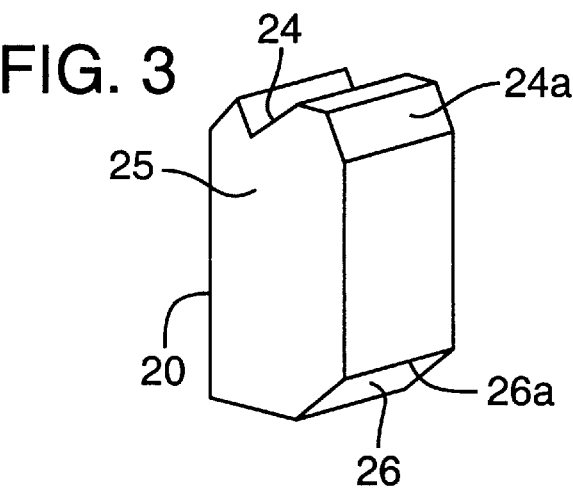
FIG. 3 shows a blocking element in a perspective view.

In this blocking position, the blocking elements 20, being manufactured from tempered steel and having an in side view according to FIG. 3 substantially oblong rectangular shape with profiled ends, form a ring shaped stop surface towards the inner edge of a groove 22 in the cylindrical part 14. The groove 22 is in accordance with prior art provided with a ring 23, having a width substantially corresponding to the depth of the groove 22.

The male connector may in accordance with prior art be inserted into the female connector 10, wherein the blocking means 20 are first pressed out by means of the front of the cylindrical part 14 of the male connector and are then resiliently pressed into the groove 22 of the male connector. The male connector 15 is now locked inside the female connector 10 and any pressure force is taken by the female connector by means of the blocking elements 20, via an angle surface 24 which is substantially at right angle to the longitudinal axis of the female connector in the locking position of the blocking elements. At the same time, the blocking elements 20 are supported by each other via the side surfaces 25, so that the force is distributed evenly to all five blocking elements being supported by a bevelled edge 26 upon the outer edge of the groove 18. By this design of the blocking elements, pressure forces are distributed over large areas without spot loadings, so that the coupling is able to withstand extraordinarily high pressure loads, up to 1500 bar, without any risk for functional disturbances.

Dismounting of the coupling is made by removal of a mounting latch 27, whereafter the male connector 15 may be pushed in further some distance into the female connector 10. By this, the ring 23 will influence the blocking elements 20 so that these are moved apart, out of the blocking position. Because the ring 23 is axially displaceable along the waist of the male connector, the ring 23 remains in the releasing position, while the male connector is pulled back out of the female connector, until the male connector is retracted with its groove 22 past the blocking elements and these may support against the surface of the cylindrical part of the male connector. The retraction of the male connector is facilitated by that the blocking means are provided with a bevelling 24a.

Figure 3A:
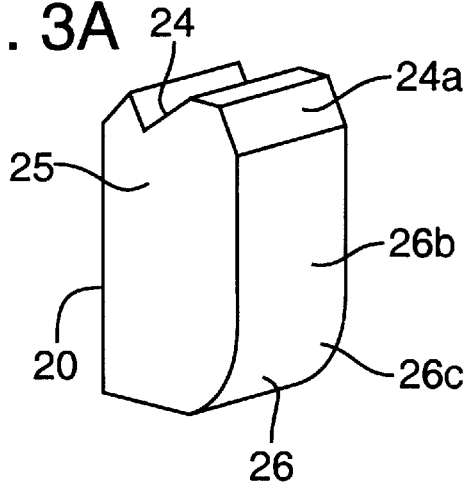
FIG. 3A shows a blocking element similar to that illustrated in FIG. 3, but with a rounded transition region.

Although an edge 26a is illustrated in FIG. 3 between base surface 26 and outer side 26b the operation of the blocking elements also may be facilitated by the provision of a rounded transition 26c between the base surface 26 and the outer side 26b, as shown in FIG. 3A, which transition forms a hinge point during pivoting between the blocking position and the releasing position.

Figure 4:
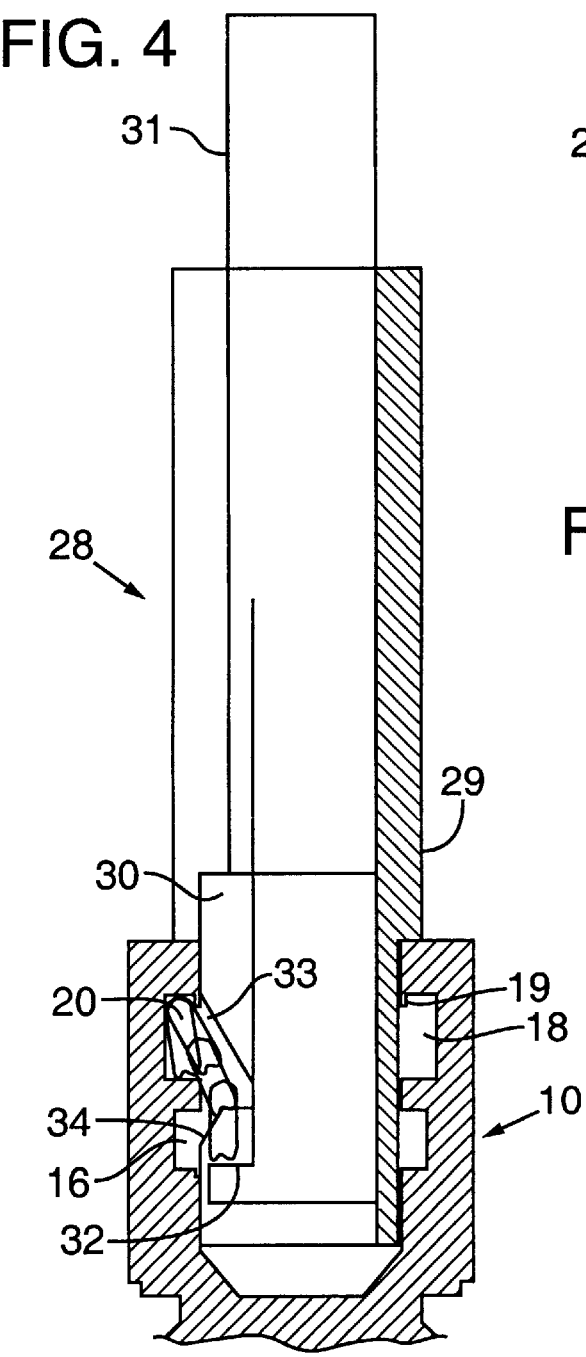
FIG. 4 shows a feeding head in a view from the side, partly sectioned.

FIG. 4 illustrates schematically how the blocking elements 20 are assembled into the female connector 10 with the aid of a feeding head 28 which is provided with a guide sleeve 29 which is insertable and rotatable inside the cylindrical space 13 of the female connector and which forms a guide for a feeding means 30, which is axially movable inside the guide sleeve 29 and comprises a coaxially arranged slide 31. This slide 31 is on one hand provided with a surface 32 which is substantially perpendicular to the longitudinal axis of the feeding head 28 and on the other an angle surface 33 which serves as a guide for guiding the edge 26 of the blocking element into the groove 18 past the flange 19, while the feeding means 30 moves into the female connector.

The guide sleeve 29 is provided with an angle surface 34 which serves for guiding the opposite edge 24 of the blocking element into the groove 18 while the guide sleeve is retracted for some distance upwards in order to fetch the next following blocking means.

FIG. 4 illustrates schematically how a blocking means 20 "is tipped" past the flange 19 into the groove 18.

The assembly of the blocking means inside the female connector is made in the following way:

An O-ring 21 is moved into position in the groove 18. The feeding head 28 is moved into the cylindrical space 13.

One blocking means at a time is fed from the opening end by means of the guide sleeve 29 wherein it rests upon the surface 32 of the sleeve inside the cylindric space 13 of the female connector, past the groove 18, to a position where the edge 26 has passed beyond the flange 19, whereafter the movement of the guide sleeve 29 into the space 13 is halted.

Then the slide 31 is moved further some distance into the space of the female connector which makes the angle surface 33 of the sleeve influence the blocking means via its edge 26 to tilt into the groove 18 past the flange 19 and the ring 21.

Then the guide sleeve 29 is pulled some distance back, wherein the angle surface 34 acts against the opposite end 24 of the blocking means, so that this end is pushed into the groove, against the ring 21.

The guide sleeve is now pulled further some distance upwards and is then rotated around its longitudinal axis for an angle corresponding to the length of arc of the blocking element, wherein a projecting packing means upon the guide sleeve is brought to displace the blocking element a corresponding distance in the groove.

The guide sleeve is now rotated back to the original position wherein the blocking element is positioned to the side of the space which is in the guide sleeve between the two angle surfaces 33, 34.

The guide sleeve is finally moved back the necessary distance out of the female connector, so that the next blocking element may be placed inside the guide sleeve, for a repetition of the above described feeding cycle.

When the last blocking element is in position in its location in the female connector, the above described rotational packing movement does not have to be performed.

The invention is not limited to the above described embodiment, but several examples are possible within the frame of the accompanying claims.

What is claimed is:

1. A quick connect/disconnect coupling between a female connector having an envelope surface and a male connector which is insertable into said female connector, wherein the male connector comprises a cylindrical part which is insertable into the female connector and which male connector is provided with a circumferential groove with a certain depth and width, a ring mounted in said circumferential groove and movable axially along the male connector between two defining walls of the groove said ring having a thickness which is substantially equal to the depth of the groove, and which female connector comprises a cylindrical space for receiving the cylindrical part of the male connector, the envelope surface of said space being provided with at least one groove, block elements received in said groove in the female connector and rotatable out of and into blocking positions in the cylindrical space, said blocking elements cooperating in their blocking position with an outer end edge of the male connector groove nearest the outer end of the male connector, and being rotatable out of their blocking position to a releasing position by movement of the ring toward said outer end edge, which movement is possible by pressing the male connector into the female connector until the blocking means are brought into a friction engagement with the peripheral surface of the ring, wherein a substantially annular flange is coaxially provided at the outward side of the groove of the female connector, substantially in line with the envelope surface of said space, the blocking elements comprise at least three substantially rigid metal arc segments resting freely in said groove of the female connector, each arc segment being rotatable into an inclined position relative to the symmetrical longitudinal axis of the female connector, said inclined position being the blocking position, in which the segments together form a truncated cone, the wide base of which is formed by first portions of the segments supported by the outward side of the groove in the female connector on the radial outside of the flange and portions of the segments spaced inwardly from said first portions combine end-to-end to support each other in a 360° ring when in a blocking position, and an elastic element engaging and biasing the metal arc segments toward said inclined position.

2. A coupling according to claim 1, wherein each arc segment is provided with a base surface which in said blocking position is located in a plane which is perpendicular to the longitudinal axis of the female connector.

3. A coupling according to claim 2, wherein each arc segment is provided with a blocking surface which in said blocking position is located in a plane which is perpendicular to the longitudinal axis of the female connector.

4. A coupling according to claim 3, wherein each arc segment is provided with a rounded transition between the base surface and the outside of the segment, which transition forms a pivot point during rotation between the blocking position and the releasing position.

5. A method for assembling a female connector for a coupling, which female connector defines a cylindrical space for receiving a cylindrical part of a male connector having a transverse edge, which cylindrical part is configured for insertion into the female connector, an envelope surface of said space being provided with at least one groove for accommodation of at least three metal arc segment blocking elements movable resiliently out of and into the cylindrical space cooperating in their blocking position with the transverse edge of the male connector, an elastic element engaging and biasing the blocking segments into the cylindrical space, wherein the groove has a width substantially corresponding to the height of the blocking elements and is provided with an annular flange constituting a stop for said blocking elements to prevent them from sliding out of their groove, comprising the steps of, positioning the elastic element in the groove, inserting a feeding head into the cylindrical space of the female connector, feeding one blocking element at a time by means of the feeding head, from the opening end of the female connector past the groove to a position beyond said groove, whereupon the blocking element is moved in the direction backwards while a portion thereof is tilted into the groove radially outwardly of the flange.

6. A method according to claim 5, wherein the tilting is accomplished by bringing a first angled surface of the feeding head to act against one edge of the blocking element, and a second angle surface on the feeding head then is brought against the opposite edge of the blocking element during retraction of the feeding head.

7. A feeding head for assembling a female connector for a coupling, which female connector comprises a cylindrical space for receiving a cylindrical part of a male connector, an envelope surface of said space being provided with at least one groove for accommodation of at least three metal arc segment blocking elements movable resiliently out of and into the cylindrical space cooperating in their blocking position with a transverse edge of the male connector, each blocking element being biased by an elastic element into the cylindrical space, wherein the groove has a width substantially corresponding to the height of the blocking elements and is provided with an annular flange constituting a stop for said blocking elements to prevent them from sliding out of their groove, wherein the feeding head operable to assemble said blocking elements in said groove is provided with a guide sleeve, which is insertable rotatably in the cylindrical space of the female connector and acts as a guide for a feeding means which is axially movable inside the guide sleeve and comprises a coaxially arranged slide.

8. A feeding head according to claim 7, wherein the slide is provided with a finger which is substantially perpendicular to the longitudinal axis of the feeding head.

9. A feeding head according to claim 7, wherein, the slide is provided with an angle surface for guiding a front edge of the blocking element into the groove, and the guide sleeve is provided with an angle surface for guiding a back edge of the blocking element into the groove.

10. A feeding head according to claim 7, wherein the guide sleeve is provided with a peripherally projecting packing means for use during assembling of the blocking elements in the groove.

\* \* \* \* \*